(12) United States Patent
Kim (10) Patent No.: US 7,647,610 B2
(45) Date of Patent: Jan. 12, 2010

(54) INTERFACING SYSTEM BETWEEN DIGITAL TV AND PLURALITY OF REMOTE CONTROLLERS, METHOD THEREOF, REMOTE CONTROLLER THEREOF, AND REMOTE CONTROLLER SIGNAL TRANSMITTING METHOD THEREOF

(75) Inventor: Ik Ju Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 528 days.

(21) Appl. No.: 10/920,191

(22) Filed: Aug. 18, 2004

(65) Prior Publication Data

US 2005/0097611 A1 May 5, 2005

(30) Foreign Application Priority Data

Aug. 19, 2003 (KR) .................. 10-2003-0057383
Sep. 29, 2003 (KR) .................. 10-2003-0067575

(51) Int. Cl.
*H04N 5/44* (2006.01)
(52) U.S. Cl. .................................. 725/46; 725/34
(58) Field of Classification Search ............. 348/734; 725/34, 36, 64
See application file for complete search history.

(56) References Cited

U.S. PATENT DOCUMENTS 6,359,661 B1 * 3/2002 Nickum ................ 348/734

| 2002/0059588 A1 * | 5/2002 | Huber et al. ........... 725/35 |
| 2004/0179142 A1 * | 9/2004 | Fang ..................... 348/734 |
| 2005/0005288 A1 * | 1/2005 | Novak .................. 725/32 |

FOREIGN PATENT DOCUMENTS

| CN | 1361975 A | 7/2002 |
| KR | 2003-0013773 A | 2/2003 |
| KR | 2003-0077513 A | 10/2003 |
| WO | WO-00/72586 A2 | 11/2000 |
| WO | WO-02/093502 A1 | 11/2002 |

* cited by examiner

*Primary Examiner*—Christopher Kelley
*Assistant Examiner*—Timothy R Newlin
(74) *Attorney, Agent, or Firm*—Birch, Stewart, Kolasch & Birch, LLP (57) ABSTRACT

The present invention provides a system and method for interfacing between a digital TV and a plurality of remote controllers, remote controller thereof, and remote controller signal transmitting method thereof, by which Java API enabling to support a plurality of remote controllers is defined to enable interfacing between the digital TV and a plurality of the remote controllers. In interfacing between a digital TV and a plurality of remote controllers, the present invention includes the steps of defining an event class including remote controller identifiers enabling to identify a plurality of the remote controllers, respectively and identifying a plurality of the remote controllers using the event class including the remote controller identifiers, respectively and controlling the digital TV according to a signal received from the identified remote controller.

9 Claims, 6 Drawing Sheets

INTERFACING SYSTEM BETWEEN DIGITAL TV AND PLURALITY OF REMOTE CONTROLLERS, METHOD THEREOF, REMOTE CONTROLLER THEREOF, AND REMOTE CONTROLLER SIGNAL TRANSMITTING METHOD THEREOF

This application claims the benefit of the Korean Applications No. P2003-57383 filed on Aug. 10, 2003 and No. P2003-67575 filed on Sep. 30, 2003 which is hereby incorporated by reference.

BACKGROUND OF THE INVENTION

1. Field of the Invention

The present invention relates to an interfacing system, and more particularly, to a system and method for interfacing between a digital TV receiver and a plurality of remote controllers, remote controller thereof, and remote controller signal transmitting method thereof.

2. Discussion of the Related Art

Recently, as broadcasting environments rapidly change into digital broadcasting from analog broadcasting, set-top boxes enabling the conventional analog TV to receive digital broadcasting or digital broadcasting receivers spread worldwide in a geometrical progression. Digital broadcasting stands in the spotlight because of its plenty of attractions such as image and sound qualities superior to those of the conventional analog broadcasting and various multimedia functions including home shopping, home banking, internet search, home office, VOD, etc.

In order to view digital broadcast via digital TV or to request necessary information to the digital TV, a remote controller is generally used as an input means. In a data broadcasting system based on Java, Java API (application programming interface) and Java application connected to the Java API to execute a predetermined control operation are needed to control a signal inputted from the remote controller. In this case, the API and application are established on Java foundation.

In case that Java application is an application used for a specific STB/DTV only, each receiver manufacturer may define a separate Java API of its own to use. Yet, in case that Java API standard is already defined, a contents provider (CP) producing Java application provides the Java application according to the defined Java API standard and the receiver manufacturer manufactures a product supporting the Java API standard.

Generally, the Java API standard associated with a remote controller is disclosed in the HAVi (home audio/video interoperability) Level 2 User Interface specification. The HAVi Level 2 User Interface specification is a universal remote controller associated interface adopted by both American data broadcasting standard and European data broadcasting standard.

Yet, in the current HAVi Level 2 User Interface specification, API enabling to support one remote controller is defined only.

This is because there exists no difficulty in controlling a predetermined system using one remote controller only.

Yet, if data broadcasting becomes generalized later, a multitude of viewers will enjoy a game with individual remote controllers, respectively. Furthermore, if a multitude of viewers view several broadcasts on one screen, they will be able to select their favorite broadcasts using a plurality of individual remote controllers, respectively.

However, the conventional broadcast receivers fail to support a plurality of remote controllers using the HAVi Level 2 User Interface specification, whereby users are unable to control a corresponding broadcast receiver using a plurality of remote controllers, respectively.

SUMMARY OF THE INVENTION

Accordingly, the present invention is directed to a system and method for interfacing between a digital TV receiver and a plurality of remote controllers, remote controller thereof, and remote controller signal transmitting method thereof that substantially obviate one or more problems due to limitations and disadvantages of the related art.

An object of the present invention is to provide a system and method for interfacing between a digital TV and a plurality of remote controllers, remote controller thereof, and remote controller signal transmitting method thereof, by which Java API enabling to support a plurality of remote controllers is defined to enable interfacing between the digital TV and a plurality of the remote controllers.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in interfacing between a digital TV and a plurality of remote controllers, an interfacing method according to the present invention includes the steps of defining an event class including remote controller identifiers enabling to identify a plurality of the remote controllers, respectively and identifying a plurality of the remote controllers using the event class including the remote controller identifiers, respectively and controlling the digital TV according to a signal received from the identified remote controller.

Preferably, in the step of defining the event class, signal informations for keys supported by each of a plurality of the remote controllers are further defined.

Preferably, in the step of defining the event class, a function enabling to identify one remote controller set to a default is further defined.

In another aspect of the present invention, in interfacing between a digital TV and a plurality of remote controllers, an interfacing method includes the steps of defining an event class including remote controller identifiers enabling to identify a plurality of the remote controllers, respectively, identifying a plurality of the remote controllers using the remote controller identifiers included in the event class, respectively, generating an event signal corresponding to the identified remote controller, and controlling the digital TV according to the event signal.

Preferably, the step of identifying a plurality of the remote controllers respectively includes the steps of deciding whether the remote controller identifiers are included in signals outputted from a plurality of the remote controllers, respectively and if the remote controller identifier is included, identifying the remote controller corresponding to the remote controller identifier.

In another aspect of the present invention, an interfacing system between a digital TV and a plurality of remote controllers includes a reception unit receiving signals from a plurality of the remote controllers, a memory storing a resource for information used in analyzing to convert remote controller identifiers for identifying a plurality of the remote controllers and remote controller signals to appropriate events, respectively, and a control unit identifying the remote controller corresponding to the signal received by the reception unit using the remote controller identifier, the control unit generating an event signal corresponding to the identified remote controller to control the digital TV according to the event signal.

Preferably, the resource includes an event manager managing an event generation according to the signal of the identified remote controller.

Preferably, the resource defines the information used in analyzing to convert the remote controller identifier enabling to one remote controller set to a default and the remote control to the appropriate event.

In another aspect of the present invention, a remote controller interfacing with a digital TV includes a key input unit for inputting key signals, a memory storing a remote controller key code and a remote controller identifier corresponding to each key of the key input unit, a control signal generating unit extracting the remote controller key code and the remote controller identifier corresponding to the inputted key signal from the memory, the control signal generating unit generating a control signal by including the remote controller identifier in the extracted remote controller key code, and a transmission unit transmitting the control signal generated from the control signal generating unit.

Preferably, the key input unit includes an identifier input key for generating the remote controller identifier.

Preferably, the remote controller further includes a remote controller identifier generating unit generating a new remote controller identifier by the key signal of the identifier input key to store the generated remote controller identifier in the memory.

Preferably, the control signal generating unit includes an extracting unit extracting the remote controller key code and the remote controller identifier corresponding to the inputted key signal and an identifier inserting unit inserting the remote controller identifier in the extracted remote controller key code.

In a further aspect of the present invention, in transmitting signals of a plurality of remote controllers for interfacing with a digital TV, a remote controller signal transmitting method includes the steps of inputting a specific key signal, extracting a remote controller key code and a remote controller identifier corresponding to the inputted key signal, generating a control signal by including the remote controller identifier in the extracted remote controller key code, and transmitting the generated control signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, in the present invention, API (application programming interface) defined to support a plurality of remote controllers can be added to the HAVi Level 2 User Interface specification or can be newly defined on a new Java package.

A first method including an API defined to support a plurality of remote controllers, which is to be added to the HAVi Level 2 User Interface specification, can be described as follows. Besides, it is not mandatory that added API names follow the suggested names in the following. The names can be redefined if meeting the content described in the following, e.g., HRcEvent( ) →LGRcEvent( ), DAVICRcEvent( ), OCAPRcEvent( ), DVBRcEvent( ), etc. public class org.havi-.ui.event.HRcEvent

---

Previously existing API:
    public HRcEvent(java.awt.Component source, int id, long when, int modifiers, int keyCode, char keyChar)
Newly added API:
    public HRcEvent(java.awt.Component source, int id, long when, int modifiers, int keyCode, char keyChar, int RcID)
    public int getRcID( )
public class org.havi.ui.event.HRcCapabilities
Previously existing API:
    protected HRcCapabilities( )
    public static HeventRepresentation getRepresentation(int aCode)
    public static boolean getInputDeviceSupported( )
    public static boolean isSupported(int keycode)
Newly added API:
    public static int getRcAmount( )
    public static HEventRepresentation getRepresentation (int RcID, intaCode)
    public static boolean getInputDeviceSupported(int RcID)
    public static boolean isSupported(int RcID, int keycode)

---

A second method including an API defined to support a plurality of remote controllers includes the steps of defining a new Java package and defining new classes in the defined package. It is a matter of course that name spaces associated with 'davic', 'ocap', and 'dvb' should be approved to use by the corresponding groups.

```
public class com.lg.ui.event.LGRcEvent
        extends org.havi.ui.event.HRcEvent
    public LGRcEvent(java.awt.Component source, int id,
            long when, int modifiers, int
            keyCode, char keyChar, int RcID)
    public int getRcID( )
public class com.lg.ui.event.LGRcCapabilities
        extends org.havi.ui.event.HRcCapabilities
    public static int getRcAmount( )
    public static HEventRepresentation etRepresentation (int
            RcID, intaCode)
    public static boolean getInputDeviceSupported(int RcID)
    public static boolean isSupported(int RcID, int
            keycode)
```

In the above definition, it is not mandatory that the package name org.lg.ui.event, class name LGRcEvent, and producer name LGRcEvent should follow the proposed names, respectively. The names can be redefined only if meeting the above described content, e.g., com.lg.ui.event→org.lg.ui.event, org.davic.ui.event, org.ocap.ui.event, org.dvb.ui.event/ LGRcEvent ( )→DAVICRcEvent( ), OCAPRcEvent( ), DVBRcEvent( ), etc. It is a matter of course that name spaces associated with 'davic', 'ocap', and 'dvb' should be approved to use by the corresponding groups.

Regarding this document, 'com.lg.ui.event.LGRcEvent' and 'com.lg.ui.event.LGRcCapabilities' will be described as representative name spaces in the following.

Looking into the specification according to the present invention, 'Class com.lg.ui.event.LGRcEvent' indicates a class for event configuration and 'Class com.lg.ui.event.LGRcCapabilities' indicates a class for confirming functions of a corresponding remote controller.

In 'Class com.lg.ui.event.LGRcEvent', a remote controller identifier (RcID) is added to the API (public LGRcEvent) defined to generate event signals according to a plurality of the remote controllers as well as a signal source (java.awt-.Component source), identifier (id), time (when), modification (modifiers), and key (keycode, keychar). Hence, if a predetermined RF signal is inputted from one specific remote controller among a plurality of the remote controllers, the remote controller is identified using the remote controller identifier (RcID) and it is checked which key is pressed in the identified remote controller using a keycode factor, keychar factor, and the like, whereby the corresponding event signal can be generated. The generated signal is notified to Java application to execute a predetermined control.

Meanwhile, the API is defined in a manner that a remote controller identifier for identifying a predetermined one of a plurality of the remote controllers is included in the class 'Class com.lg.ui.event.LGRcCapabilities' for confirming the respective functions of a plurality of the remote controllers.

For instance, as a specific remote controller should be identified to obtain a HeventRepresentation object of the specific remote controller among a plurality of the remote controllers, the remote controller identifier RcID and a specific key event identifier aCode should be included in a getRepresentation function. Hence, the corresponding remote controller is identifier by the remote controller identifier and the HeventRepresentation object for the key event identifier of the corresponding identified remote controller can be obtained.

Moreover, it is defined to include a remote controller identifier, which indicates which one of a plurality of the remote controllers exists, in the API (public static boolean getInputDeviceSupported(int RcID)) confirming whether a plurality of the remote controllers exist.

Hence, it is able to confirm the functions of the corresponding identified remote controller among a plurality of the remote controllers using the APIs defined to identify a specific one of a plurality of the remote controllers in 'Class com.lg.ui.event.LGRcCapabilities'. For instance, 'public static int getRcAmount( )' is the API for confirming the number of remote controllers, 'public static HEventRepresentation getRepresentation(int RcID, int aCode)' is the API defined to obtain the HeventRepresentation object for the specific key event identifier, 'public static boolean getInputDeviceSupported(RcID)' is the API defined to confirm whether the corresponding remote controller exists, and 'public static boolean isSupported(int RcID, int keycode)' is the API defined to confirm whether the remote controller generates the event for the given type (keycode). In this case, the remote controller identifier (RcID) enabling to identify a corresponding one of a plurality of the remote controllers is included in each of 'public static HEventRepresentation getRepresentation(int RcID, int aCode)', 'public static boolean getInputDeviceSupported(RcID)', and 'public static boolean isSupported(int RcID, int keycode)'.

Meanwhile, the previously defined APIs can be refined as operating for a basic remote controller having a remote controller identifier (RcId) of '0'. Accordingly, if a remote controller is the basic remote controller set to 'default', a remote controller signal is controller using the previously defined API. On the other hand, if there exist a plurality of remote controllers, an RF signal of remote controller can be controlled using the API defined in the present invention.

In the present invention, an RcID value is set to '0' for a remote controller signal failing to support a remote controller and an RcID value is set to a corresponding identifier ID for a remote control signal supporting a remote controller identifier, whereby it is well designed to prevent collisions with the previously defined APIs.

An apparatus and method for supporting a plurality of remote controllers using 'LGRcEvent' and 'LGRcCapabilities' are explained as follows.

Figure 1:
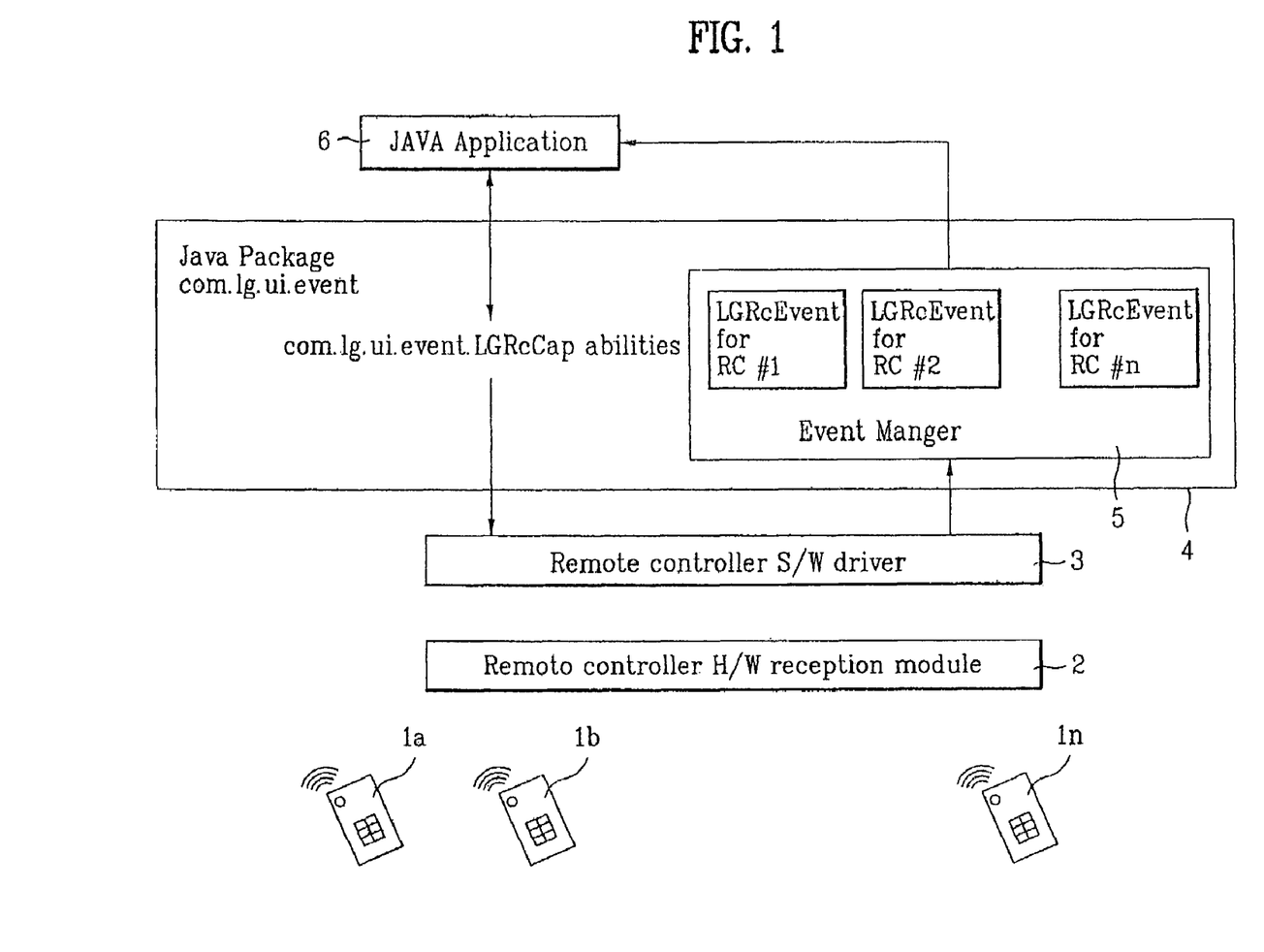
FIG. 1 is a block diagram of an apparatus for supporting a plurality of remote controllers according to one preferred embodiment of the present invention.

FIG. 1 is a block diagram of an apparatus for supporting a plurality of remote controllers according to one preferred embodiment of the present invention.

Referring to FIG. 1, an apparatus for supporting a plurality of remote controllers according to one preferred embodiment of the present invention includes a plurality of remote controllers 1a, 1b, . . . 1n, a remote controller hardware reception module 2 receiving RF signals generated from a plurality of the remote controllers 1a, 1b, . . . 1n, respectively, a remote controller software driver 3 processing the received RF signals to implement by software, a Java Package com-.lg.ui.event 4 identifying a corresponding one of a plurality of the remote controllers using an API defined by the present invention based on the processed RF signals to generate an event signal for the corresponding remote controller, and a Java application 6 performing a control according to the generated event signal. In this case, the Java Package com-.lg.ui.event 4 includes an event manager 5 for managing an event generation according to the RF signal of the remote controller.

As mentioned in the above description, the Java-based event class (Class com.lg.ui.event.LGRcEvent) and functional class (Class com.lg.ui.event.LGRcCapabilities) are described in the Java Package com.lg.ui.event 4 to support a plurality of the remote controllers 1a, 1b, . . . and 1n. And, APIs including remote controller identifiers RcID enabling to identify a plurality of the remote controllers can be defined in the event class and functional class, respectively. Moreover, the previously defined APIS are reused in the Java Package com.lg.ui.event 4 to be usable in case that one remote controller is provided via mode modification.

In case of receiving a predetermined signal from one of a plurality of the remote controllers 1a, 1b, . . . 1n, the Java Package com.lg.ui.event 4 identifies the corresponding remote controller using the remote controller identifier RcID included in the event class. And, the Java Package com.lg.ui.event 4 generates an event signal for the remote controller corresponding to the remote controller identifier included in the event class to notify to the application. For instance, once the RF signal is received from the first remote controller; the Java Package com.lg.ui.event 4 identifies the first remote controller using the remote controller RcID of the event class and generates an event signal (LGRcEvent for RC#1) corresponding to the first remote controller to notify to the Java application 6. Of course, the Java Package com.lg.ui.event 4 identifies the RF signals generated from the second to $n^{th}$ remote controllers and then generates the corresponding event signals, respectively to notify to the Java application 6 as well.

And, the Java Package com.lg.ui.event 4 identifies the corresponding remote controller using the remote controller identifier included in the functional class. Moreover, the Java Package com.lg.ui.event 4 confirms a function of the remote controller corresponding to the remote controller identifier included in the functional class to notify to the application.

An operation of the above-explained apparatus for supporting a plurality of the remote controllers is explained as follows.

First of all, the RF signal generated from one of a plurality of the remote controllers 1a, 1b, . . . and 1n is provided to the Java Package com.lg.ui.event 4 via the remote controller hardware reception module and the remote controller software driver.

In case of receiving the RF signal generated from one remote controller, the Java Package com.lg.ui.event 4 identifies the remote controller corresponding to the RF signal using the remote controller identifier included in the event class, confirms which key is pressed from the identified remote controller, and then generates a corresponding predetermined event signal.

Subsequently, the generated event signal is notified to the Java application 6 to execute a predetermined control.

Meanwhile, the Java application 6 enables to confirm the supportable functions of the remote controllers via the Java Package com.lg.ui.event 4. In other words, if the Java application 6 makes a confirmation request for a supportable function for a predetermined remote controller, the Java Package com.lg.ui.event 4 identifies the corresponding remote controller using the remote controller identifier RcID included in the functional class to identify the remote controller requested by the Java application 6 and then confirms various functions such as the number of the remote controllers, existence or non-existence of the corresponding remote controller, presence or non-presence of event-supporting capability of the corresponding remote controller, and the like for the corresponding remote controller using the APIs defined in the functional class to notify to the Java application 6.

Figure 2:
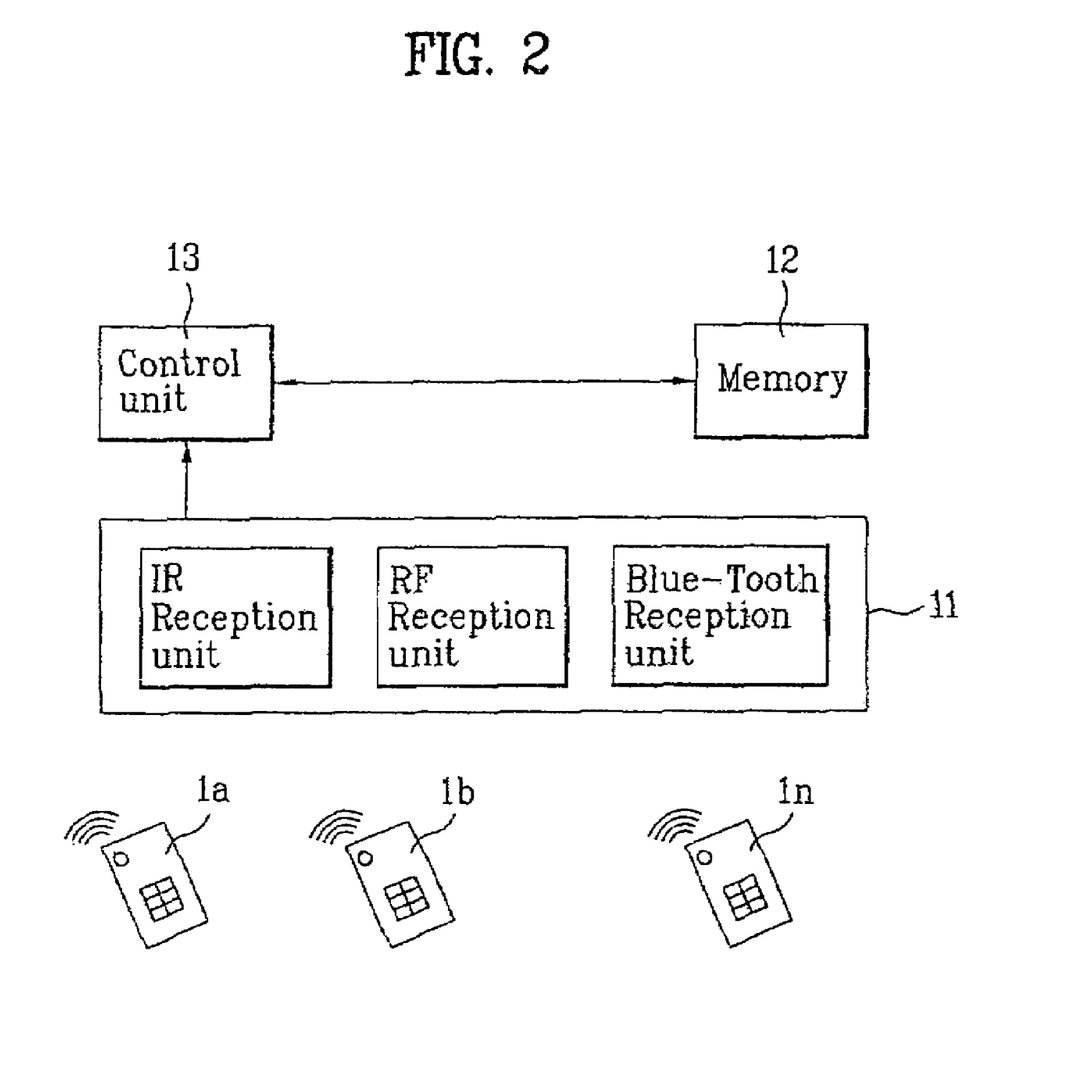
FIG. 2 is a block diagram of an interfacing system between a digital TV and a plurality of remote controllers according to the present invention.

FIG. 2 is a block diagram of an interfacing system between a digital TV and a plurality of remote controllers according to the present invention.

Referring to FIG. 2, an interfacing system between a digital TV and a plurality of remote controllers according to the present invention includes a reception unit 11, a memory 12, and a control unit 13.

The reception unit 11 receives signals from a plurality of remote controllers 1a, 1b, . . . and 1n. The reception unit 11 may include at least one of an IR reception unit, RF reception unit, and Blue-tooth unit to receive at least one of IR (infrared), RF, and Blue-Tooth signals, respectively. Transport protocols between the reception unit 11 and a plurality of the remote controllers 1a, 1b, . . . 1n can adopt various transport systems and protocols of RF, IR, Blue Tooth, and the like or their combinations.

The memory 12 stores resource for informations used in analyzing to convert remote controller identifiers for identifying a plurality of the remote controllers and remote controller signals to appropriate events, respectively. And, the memory 12 includes an event manager for managing an event generation according to the signal of the identified remote controller.

And, the control unit 13 decides whether the remote controller identifier is included in the signal received by the reception unit 11. In case of deciding that the remote controller identifier is included in the signal, the control unit 13 identifies the remote controller corresponding to the signal received by the reception unit 11 using the informations stored in the memory 12 and generates an event signal corresponding to the identified remote controller to control the digital TV according to the event signal. In case of deciding that the remote controller identifier is not included in the signal, the control unit 13 recognizes the remote controller as a default-set remote controller and then generates an event signal corresponding to the recognized remote controller to control the digital TV according to the event signal.

Figure 3:
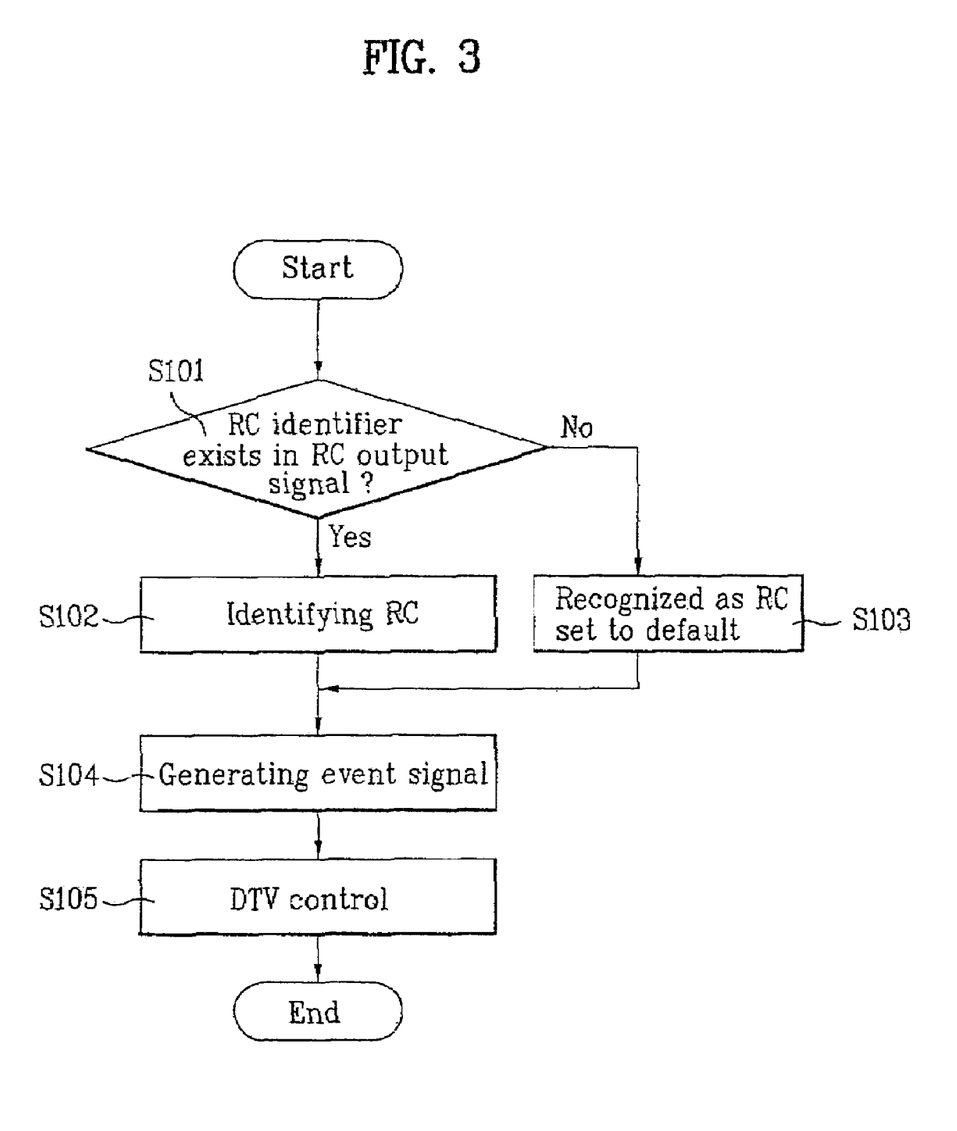
FIG. 3 is a flowchart of a method of interfacing between a digital TV and a plurality of remote controllers according to the present invention.

FIG. 3 is a flowchart of an interfacing method between a digital TV and a plurality of remote controllers according to the present invention.

Referring to FIG. 3, a control unit of an interfacing system decides whether remote controller identifiers are included in signals outputted from a plurality of remote controllers (S101). If the remote controller identifier is included in the outputted signal, the control unit identifies the remote controller corresponding to the remote controller identifier using the remote controller identifier included in an event class (S102). If the remote controller identifier is not included in the outputted signal, the control unit recognizes that the outputted signal is outputted from the remote controller set to a default (S103).

Subsequently, the control unit generates an event signal corresponding to the identified remote controller (S104). The control unit then controls the digital TV according to the event signal (S105).

Figure 4:
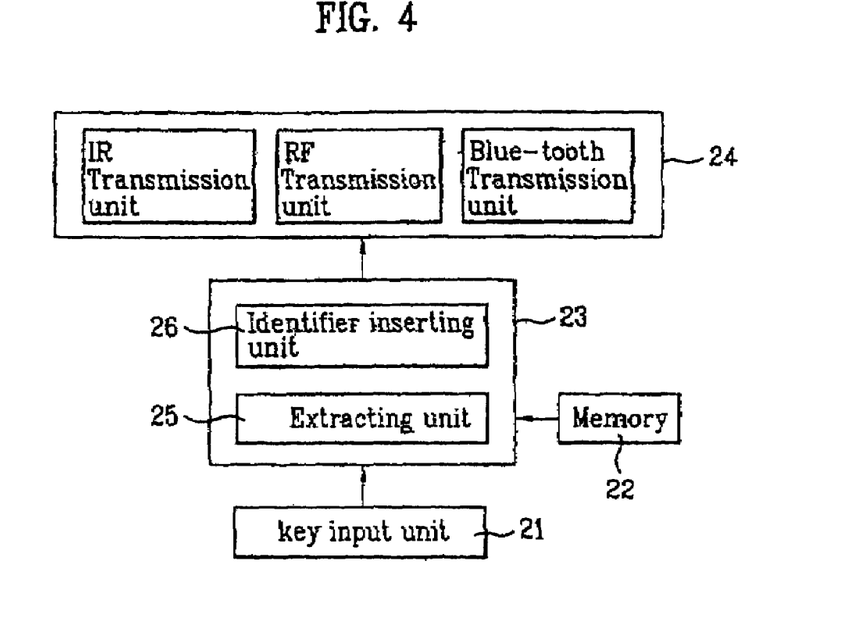
FIG. 4 is a block diagram of one of a plurality of remote controllers for interfacing with a digital TV according to the present invention.

FIG. 4 is a block diagram of one of a plurality of remote controllers for interfacing with a digital TV according to the present invention.

Referring to FIG. 4, a remote controller includes a key input unit 21, a memory 22, a control signal generating unit 23, and a transmission unit 24.

The key input unit 21 includes input keys for outputting key signals requested by a user, respectively and the memory 22 stores remote controller key codes and remote controller identifier corresponding to the input keys, respectively. Preferably, the remote controller key codes and identifiers stored in the memory 22 are previously determined by a provider or are randomly assigned by the user.

The control signal generating unit 23 includes an extracting unit 25 extracting the remote controller key code and remote controller identifier corresponding to the inputted key signal and an identifier inserting unit 26 inserting the remote controller identifier in the extracted remote controller key code.

And, the transmission unit 24 transmits a control signal generated from the control signal generating unit 23. Moreover, the transmission unit may include at least one of IR, RF, and Blue-Tooth transmission units to transmit at least one of IR, RF, and Blue-Tooth signals, respectively.

Figure 5:
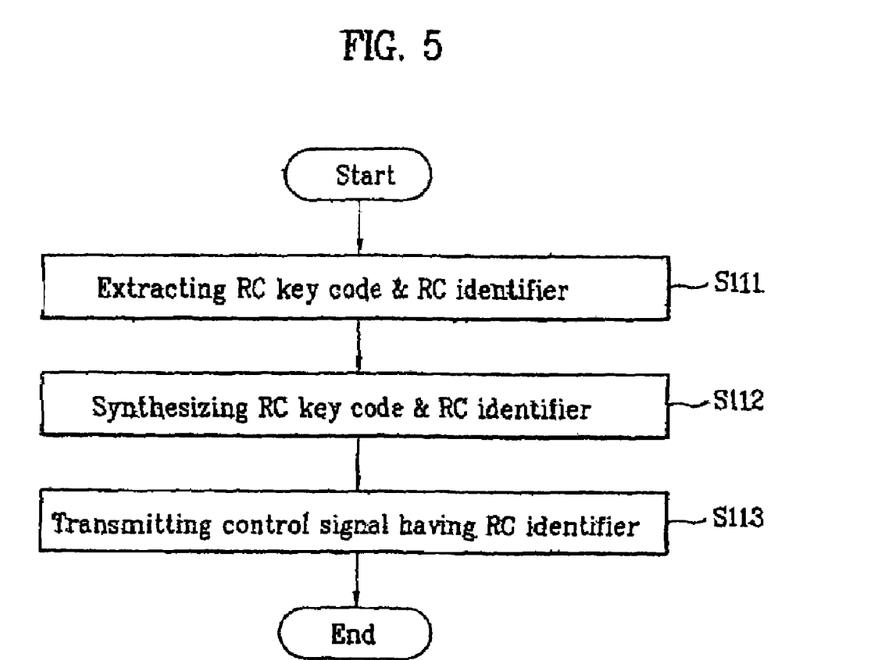
FIG. 5 is a flowchart of a signal transmitting method of the remote controller in FIG. 4.

FIG. 5 is a flowchart of a signal transmitting method of the remote controller in FIG. 4.

Referring to FIG. 5, when a user inputs a specific key signal via the key input unit, the extracting unit of the control signal generating unit extracts the remote control key code and remote controller identifier corresponding to the inputted key signal from the memory (S111).

Subsequently, the identifier inserting unit of the control signal generating unit includes the remote controller identifier in the extracted remote controller key code to generate a control signal (S112).

The transmission unit then transmits the generated control signal (S113).

Figure 6:
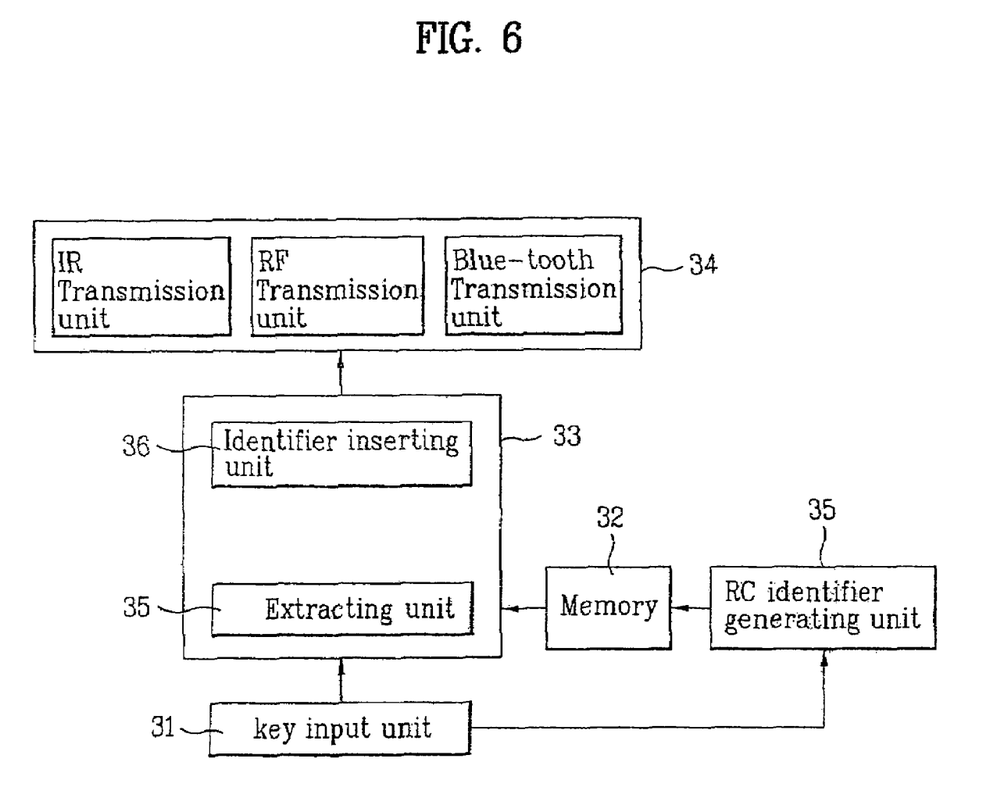
FIG. 6 is a block diagram of a remote controller according to another embodiment of the present invention.

FIG. 6 is a block diagram of a remote controller according to another embodiment of the present invention.

Referring to FIG. 6, a remote controller according to another embodiment of the present invention includes an identifier input key in a key input unit 31 to enable a user to directly generate a remote controller identifier.

Hence, if the user presses the identifier input key, a remote controller identifier generating unit 35 generate a new remote controller identifier according to a key signal of the identifier input key and the generated remote controller identifier is stored in a memory 32.

Meanwhile, the rest elements of the remote controller according to another embodiment of the present invention are equivalent to those in FIG. 4, of which explanation is skipped in the following.

Figure 7:
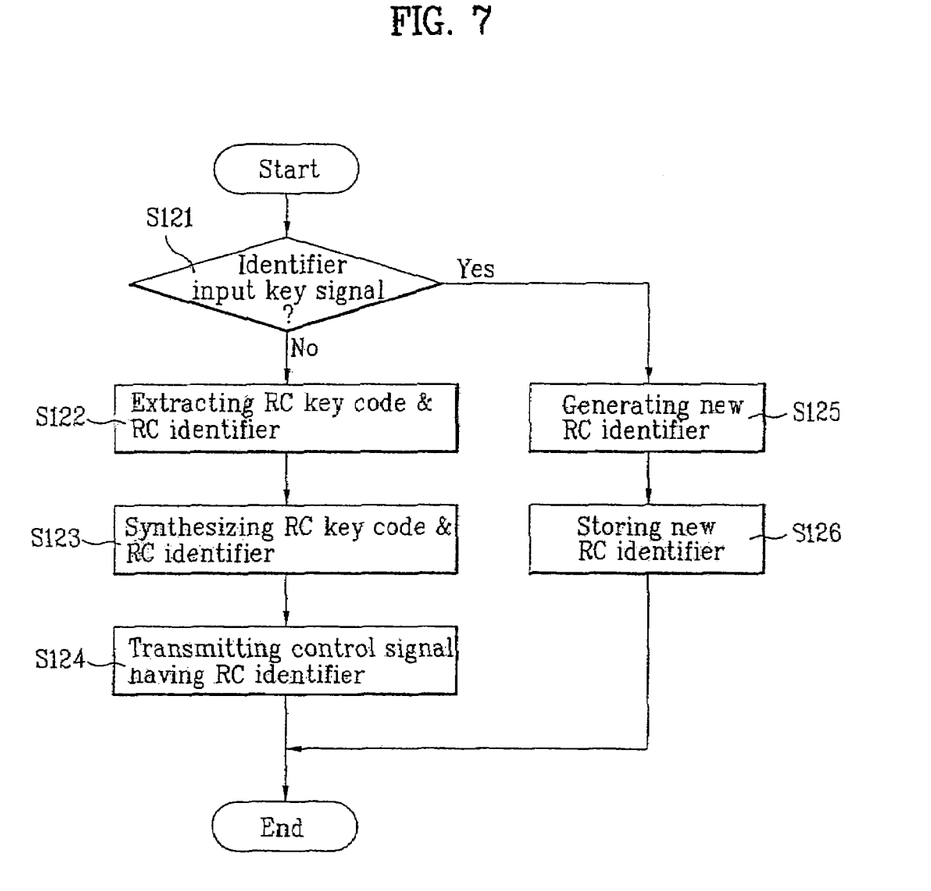
FIG. 7 is a flowchart of a signal transmitting method of the remote controller in FIG. 6.

FIG. 7 is a flowchart of a signal transmitting method of the remote controller in FIG. 6.

Referring to FIG. 7, once a user inputs a specific key signal via the key input unit, the control unit decides whether the inputted key signal is an identifier input key signal for generating a remote controller identifier (S121).

If the inputted key signal is the identifier input key signal, the remote controller identifier generating unit generates a new remote controller identifier (S125). The generated remote controller identifier is then stored in the memory (S126). Finally, the operation ends.

If the inputted key signal is not the identifier input key signal, the extracting unit of the control signal generating unit extracts a remote control key code and remote controller identifier corresponding to the inputted key signal from the memory (S122).

Subsequently, the identifier inserting unit of the control signal generating unit includes the remote controller identifier in the extracted remote controller key code to generate a control signal (S123).

The transmission unit then transmits the generated control signal (S124).

In the above description, the method and apparatus for supporting a plurality of remote controllers in the data broadcasting environment only. Yet, it is apparent that the present invention be applicable to any environments using a plurality of remote controllers.

As mentioned in the foregoing description, the present invention previously defines the event class and functional class to identify a plurality of remote controllers to identify a plurality of the remote controllers, thereby enabling to perform the corresponding control.

Accordingly, compared to the related art supporting one remote controller only, the present invention enables to support a plurality of the remote controllers, thereby enhancing user's convenience.

Besides, the method and apparatus for supporting a plurality of the remote controllers according to the present invention will be usefully applicable to the case that a plurality of users enjoy game(s) or view various channels on one screen.

It will be apparent to those skilled in the art that various modifications and variations can be made in the present invention. Thus, it is intended that the present invention covers the modifications and variations of this invention provided they come within the scope of the appended, claims and their equivalents.

What is claimed is:

1. A method of operating with multiple remote controllers in a digital broadcasting receiver able to receive and process a data broadcast, the method comprising:

storing a Java-based event class and a Java-based function class, each including multiple APIs (Application Programming Interfaces) mapped with each of the multiple remote controllers, the multiple APIs defining remote controller identifiers identifying the multiple remote controllers;

receiving a request signal for entering a simultaneous operation mode of the multiple remote controllers in which commands of the multiple remote controllers are able to be processed in the digital broadcasting receiver at the same time;

accessing a first of the multiple APIs, based on a first remote controller identifier defined in the first API, when a first request signal for processing a first command of a first remote controller is received;

accessing a second of the multiple APIs, based on a second remote controller identifier defined in the second API, when a second request signal for processing a second command of a second remote controller is received; and controlling the digital broadcasting receiver to execute both the first and second commands in accordance with each of the first and second APIs and the simultaneous operation mode.

2. The method of claim 1, wherein each of the multiple APIs further define signal information for keys supported by a corresponding one of the multiple controllers.

3. The method of claim 1, wherein at least one of the function class API and the event class API further define a function for identifying a remote controller as a default remote controller.

4. The method of claim 1, wherein the first request signal includes the first remote controller identifier and/or the second request signal includes the second remote controller identifier.

5. The method of claim 4, the method further comprising:

identifying one of the first and second remote controller as a default remote controller if a corresponding one of the first and second request signals does not include a corresponding remote controller identifier.

6. A digital broadcasting receiver configured to operate with multiple remote controllers in a data broadcasting mode, the receiver comprising:

a storing unit configured to store a Java-based event class and a Java-based function class, each including multiple APIs (Application Programming Interfaces) mapped with each of the multiple remote controllers, the multiple APIs defining remote controller identifiers identifying the multiple remote controllers;

a receiving unit configured to receive a request signal for entering a simultaneous operation mode in which commands of the multiple remote controllers are able to be processed at the same time;

an accessing unit configured to access
- a first of the multiple APIs, based on a first remote controller identifier defined in the first API, when a first request signal for processing a first command of a first remote controller is received, and
- a second of the multiple APIs, based on a second remote controller identifier defined in the second API, when a second request signal for processing a second command of a second remote controller is received; and a control unit configured to control to execute both the first and second commands in accordance with each of the first and second APIs and the simultaneous operation mode.

7. The receiver of claim 6, wherein the control unit includes an event manager configured to manage an event signal generation according to one of the first and second request signals.

8. The receiver of claim 6, wherein one of the first and second request signals is one of an infrared (IR) signal, a RF signal, and a Blue-Tooth signal.

9. The receiver of claim 6,
   wherein the first request signal includes the first remote controller identifier and/or the second request signal includes the second remote controller identifier, and
   wherein the control unit is configured to identify one of the first and second remote controller as a default remote controller if a corresponding one of the first and second request signals does not include a corresponding remote controller identifier.

* * * * *